June 13, 1939.   W. STOCKER   2,162,668
LOG LIFTING CANT HOOK
Filed Aug. 20, 1938
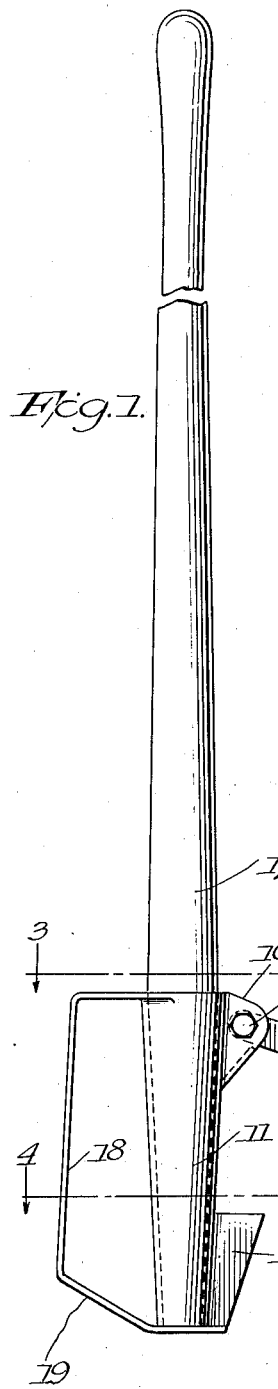
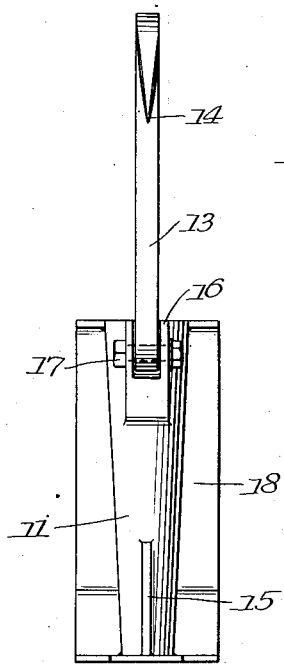
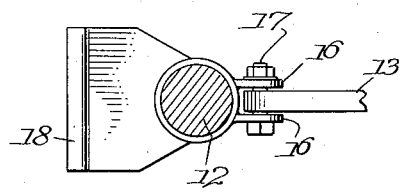
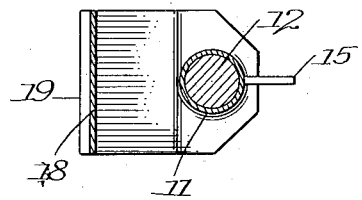
Inventor
William Stocker
By Emery, Booth, Holcombe Miller
his Attorneys Patented June 13, 1939

2,162,668

UNITED STATES PATENT OFFICE 2,162,668

LOG LIFTING CANT HOOK

William Stocker, Chattanooga, Tenn., assignor to Dixie Logging Tool Co., Chattanooga, Tenn., a corporation of Tennessee Application August 20, 1938, Serial No. 225,987

2 Claims. (Cl. 294—17)

This invention relates to implements for manually turning and lifting logs during lumbering and sawing operations, and is particularly useful in handling small logs being sawed into cross-ties and pulp mill lengths.

The invention aims to provide a light, strong, compact implement of the peavey type having a fixed jaw and pivoted cant-hook on one side for seizing the log and a step for bracket on the opposite side of the socket for elevating and supporting the log from the ground.

Further objects and advantages of the invention appear in connection with the description of the illustrative embodiment shown in the accompanying drawing, wherein Fig. 1 is a side view of a log-lifting peavey showing the cant hook in grasping position;

Fig. 2 is a front view of the socket member removed from the stock, showing the cant-hook in widespread position;

Fig. 3 is a cross-section of the same on line 3—3 in Fig. 1, the cant-hook being shown broken off at the point or dog end; and Fig. 4 is a cross-section on the line 4—4 of Fig. 3, both Figs. 3 and 4 being taken looking in the direction of the arrows.

The implement comprises a metal socket member 11, having a socket for receiving a stock 12 of wood, and pivoted thereto a steel cant-hook 13 of usual shape having a point or dog 14.

The socket member is preferably made from sheet steel, formed and welded together in a strong, light, readily fabricated unit, provided with a sharp vane 15 or point on its toe and a pair of lugs 16 spaced therefrom for supporting the pivot bolt 17 of the cant-hook. On the opposite side of the socket is a heel member 18 in the form of a strap welded to the socket at the toe and heel ends and spaced therefrom some two inches at the heel and two and half inches near the toe, sloping to the toe from its point of maximum distance away from the socket so as to make a fulcrum portion 19 near the toe.

In use the peavey is thrust with the fixed point 15 against one side of the log and the dog 14 engaged with the opposite side of the log, and the log turned over by means of the stock until the fulcrum 19 hits the ground and lifts the log onto the heel member 18, where it is supported clear of the ground, the stock 12 lying substantially parallel to the ground in this position. The log is thereby held in position to be sewed across by a cut on either side of the point where it is grasped by the peavey, and the two parts will tend to separate as the cut proceeds, thus preventing any seizing or cramping of the saw in the kerf.

The implement is capable of use both as a peavey and as a log lifter without change, and is very little heavier than peavies of similar strength and capacity without the log lifting function. The invention is not restricted to the design exactly as shown, as variations in the shape and dimensions of the parts may obviously be made to adapt the implement to special uses.

I claim the following as my invention:

1. A log turning and lifting device comprising a stock provided with a socket member at one end having a cant-hook pivoted thereto at one side, and a fulcrum integral with said solvent member disposed upon the opposite side to said cant-hook, said fulcrum consisting of a bent metal strap welded to the socket member at its ends and having its middle portion spaced therefrom, whereby said device may be used either as a peavy or log lifter without change.

2. A device as described in claim 1 wherein the fulcrum consists of a metal strap bent at its ends and welded to the socket at the extremities of the bent portions, said fulcrum having a portion extending along and spaced from said socket to constitute a support for the socket and log carried thereby when the latter is turned sufficiently for the stock to be substantially parallel to the ground.

WM. STOCKER.